May 14, 1963  E. J. FORSYTH ETAL  3,089,611
ARTICLE HANDLING APPARATUS
Filed Sept. 8, 1959  5 Sheets-Sheet 1
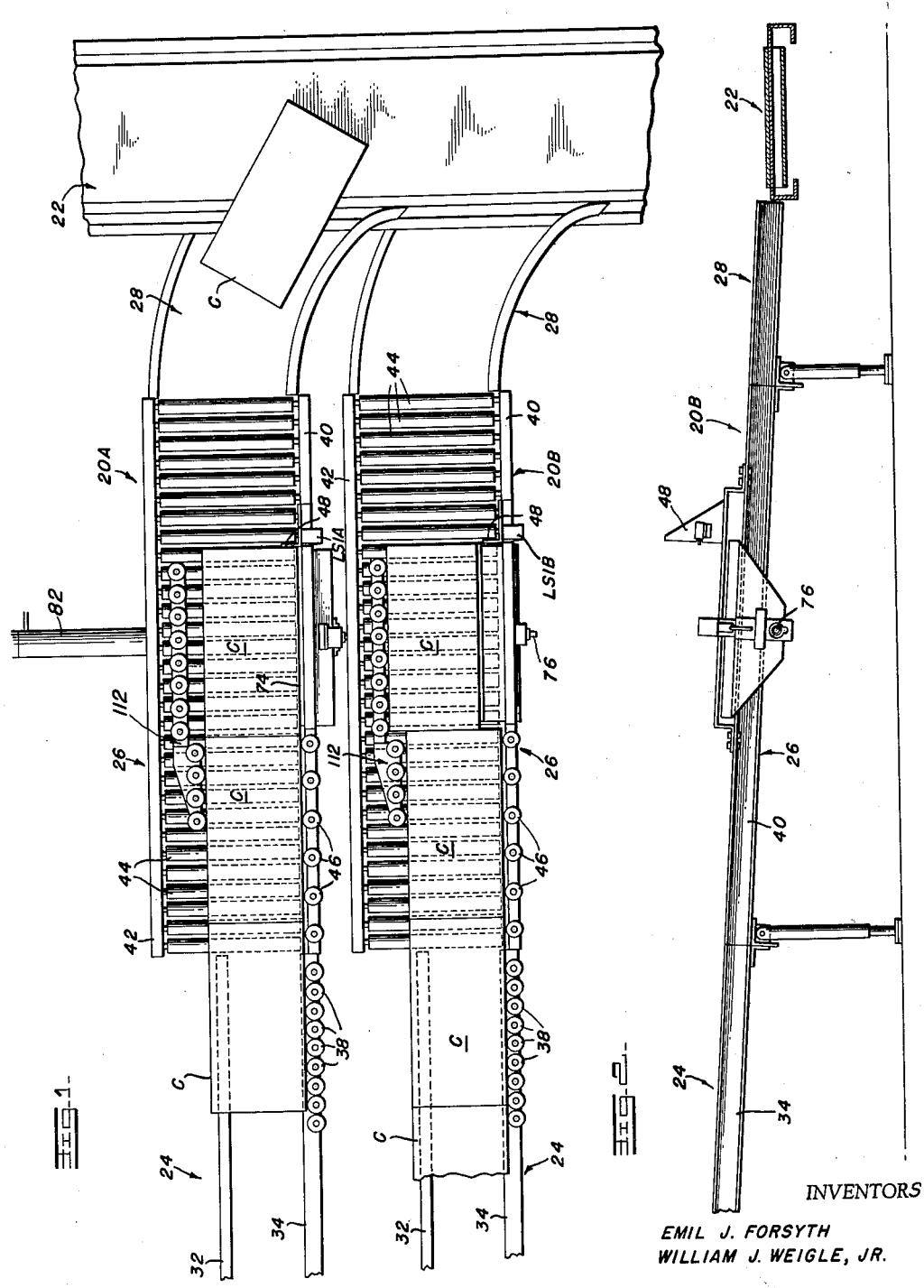
INVENTORS
EMIL J. FORSYTH
WILLIAM J. WEIGLE, JR.
BY *Mead, Browne, Schuyler & Beveridge*
ATTORNEYS

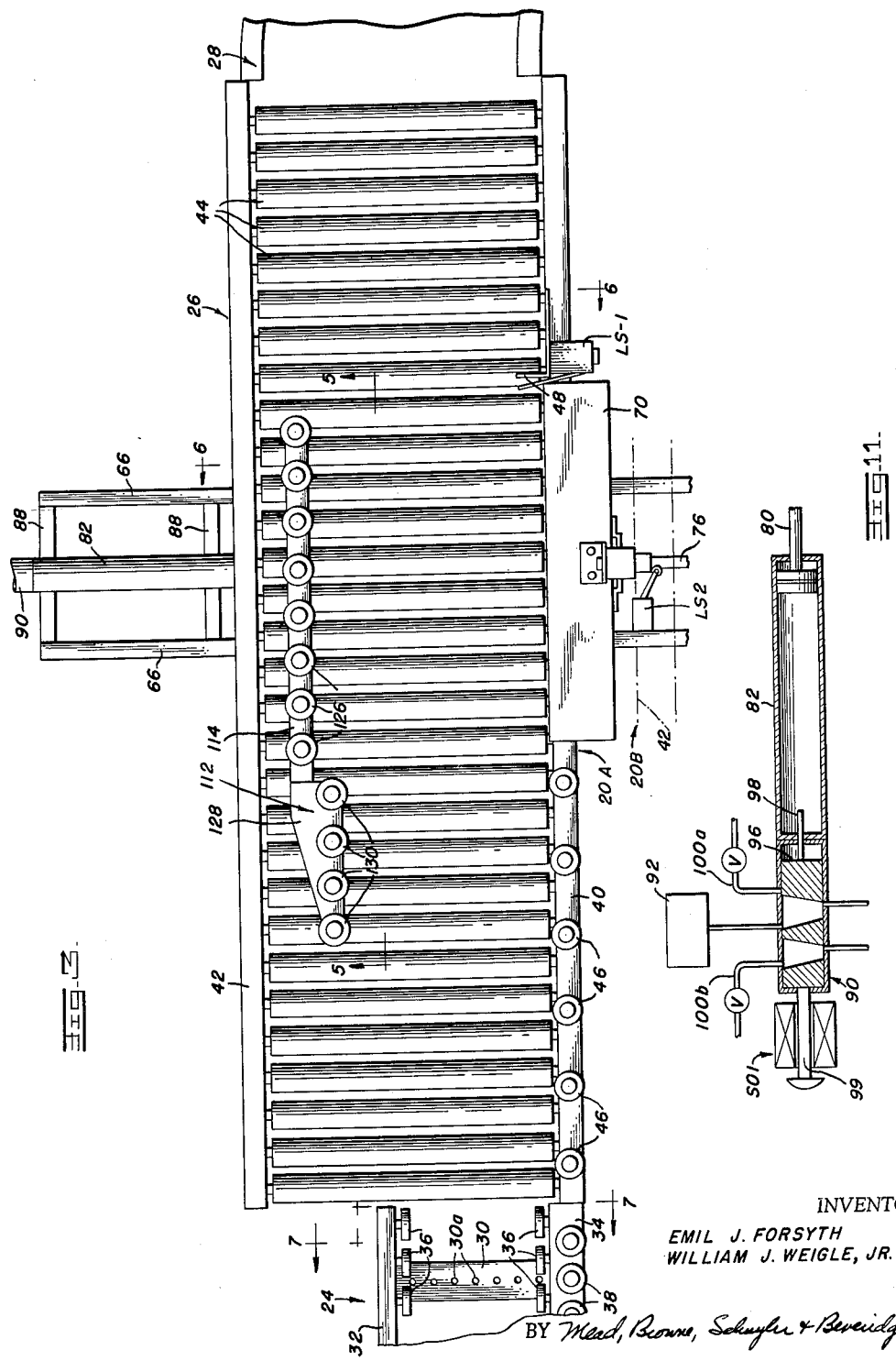

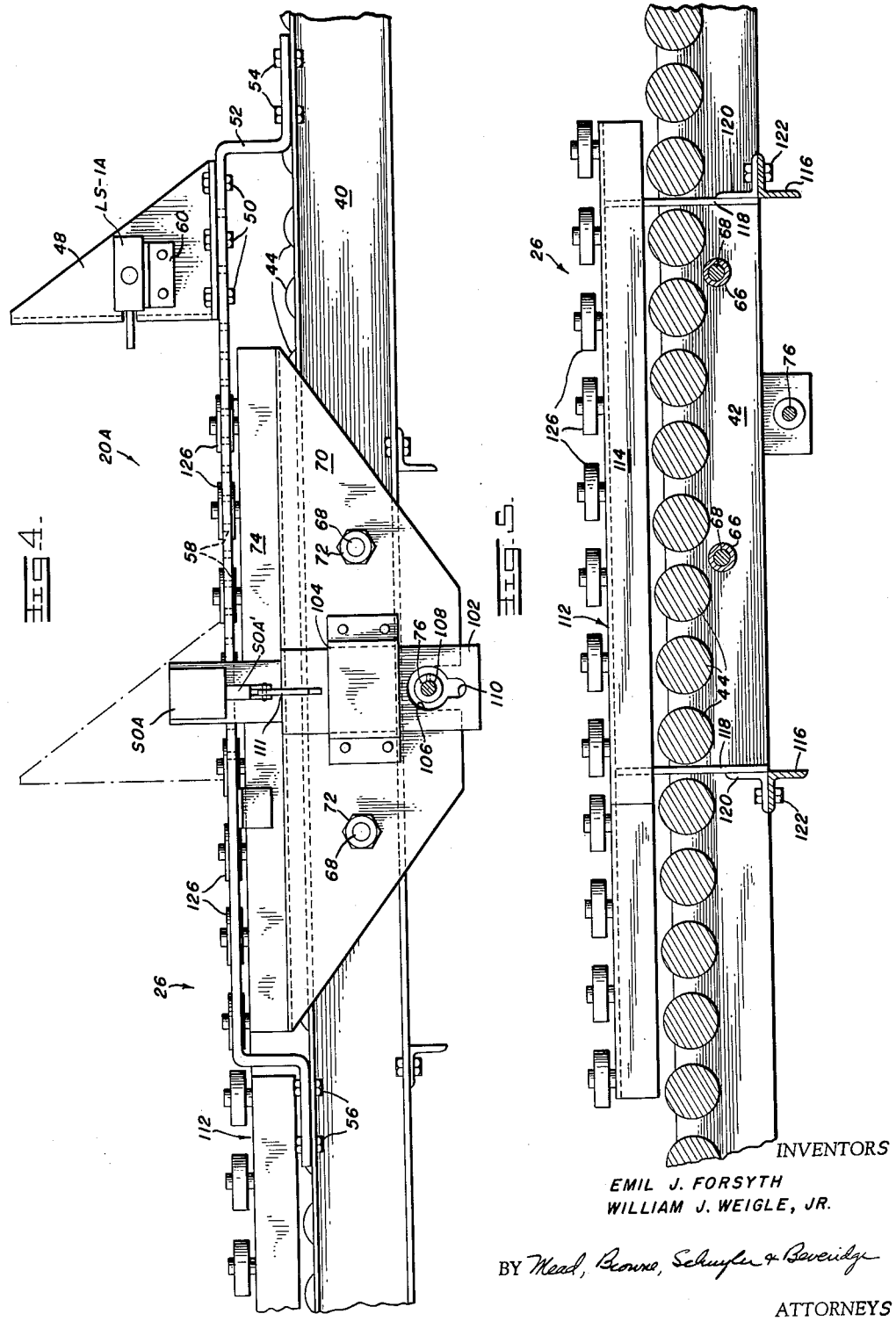

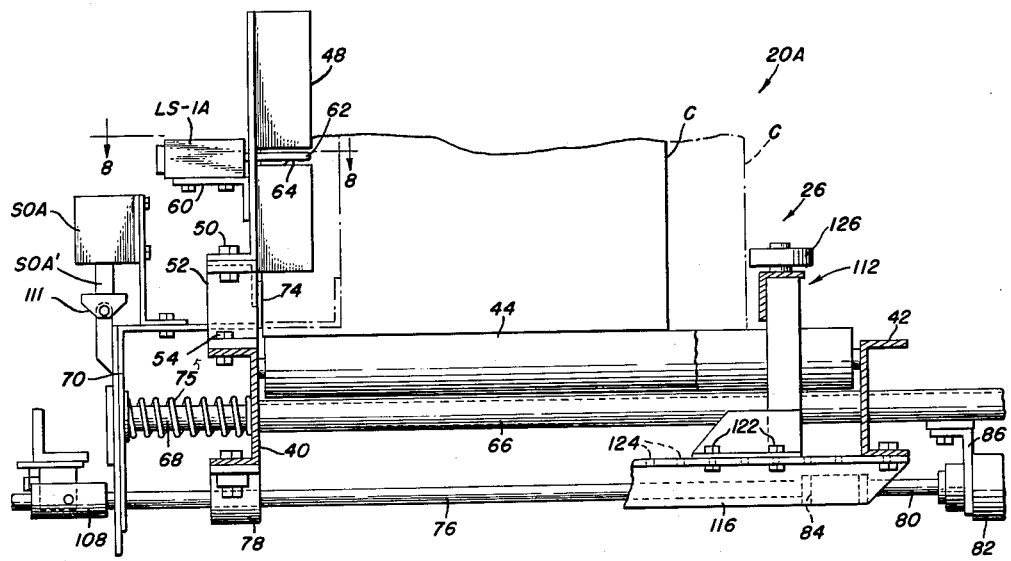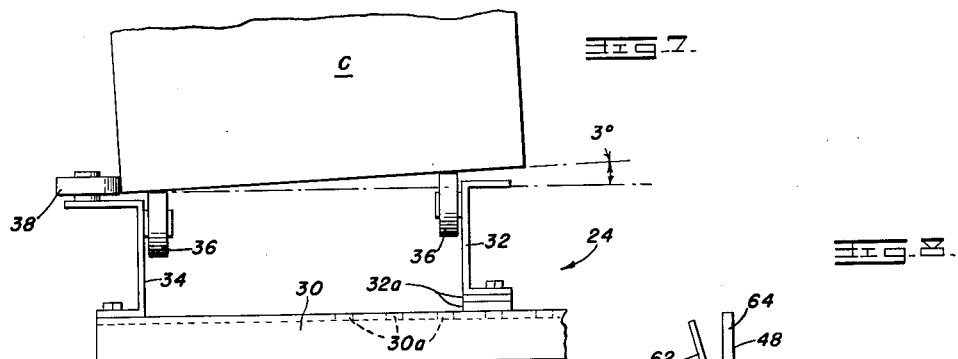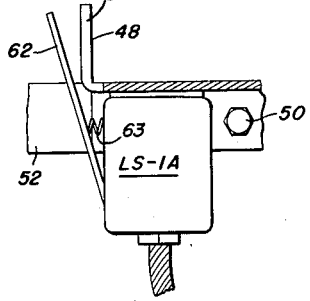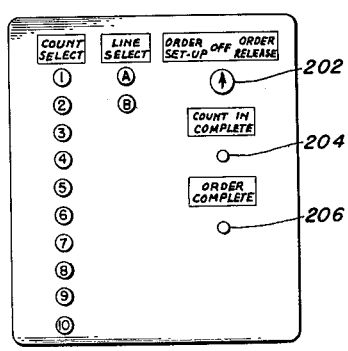
INVENTORS
EMIL J. FORSYTH
WILLIAM J. WEIGLE, JR.

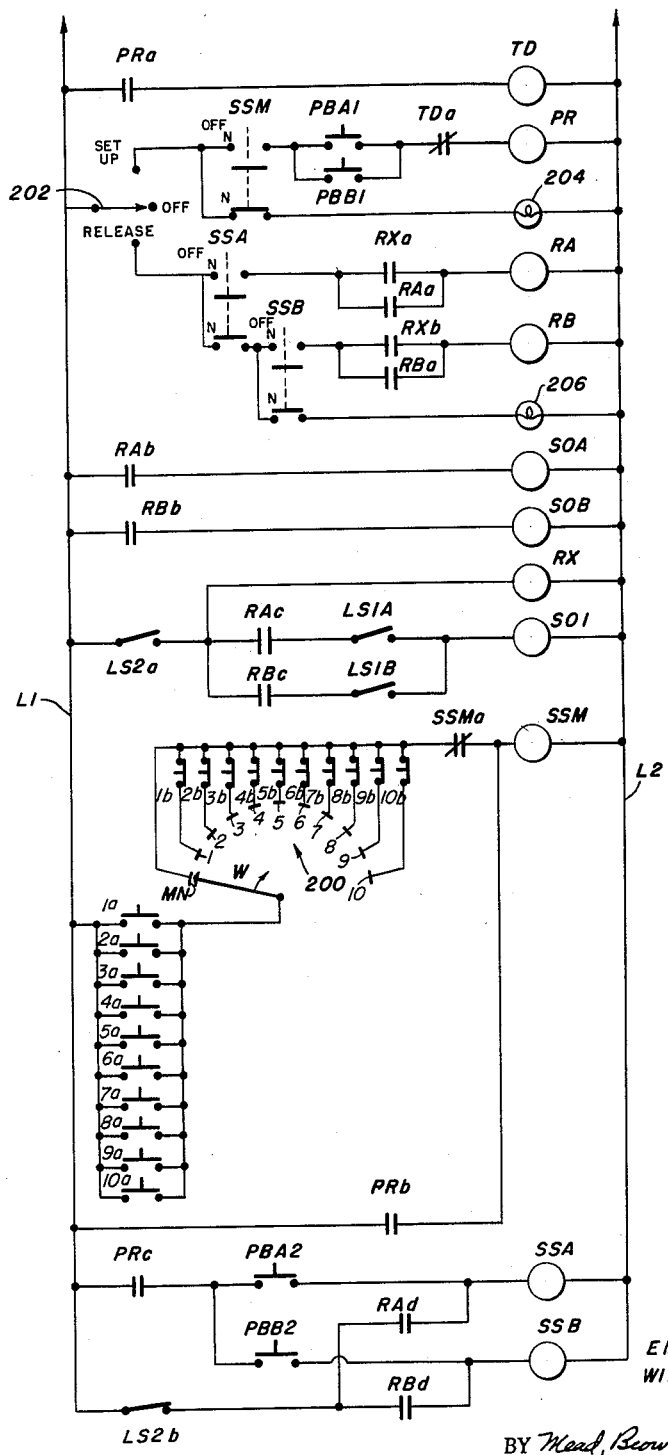

United States Patent Office 3,089,611
Patented May 14, 1963

---

3,089,611
ARTICLE HANDLING APPARATUS
Emil J. Forsyth and William J. Weigle, Jr., Ellwood City, Pa., assignors to Mathews Conveyor Company, Ellwood City, Pa., a corporation of Pennsylvania
Filed Sept. 8, 1959, Ser. No. 838,469
4 Claims. (Cl. 221—7)

This invention relates to article handling apparatus, and more particularly to apparatus for storing articles in a plurality of groups and for automatically discharging or releasing individually selected numbers of articles from selected groups.

The invention is particularly adapted for use in the field of automatic warehousing wherein cartons are stored on a plurality of storage conveyers, each conveyer supporting cartons containing a single type or a fixed quantity of articles. In the usual case, the storage conveyers are located to discharge articles upon a main conveyer which conveys the articles to a loading station. A master control station is conventionally provided from which an operator may operate any one of the storage conveyers to discharge a selected number of articles. In order to be economically practical, each storage conveyer should be capable of storing a reasonably large number of cartons and thus, when the storage conveyer utilizes gravity as the conveying source, a sufficient incline to discharge cartons at a reasonably rapid rate results in substantial pressure of articles on the storage line and occasions a substantial amount of pounding of the cartons against the conveyer escapement mechanism, sometimes causing cartons to "drive through" or be inadvertently released by the escapement mechanism.

Since each storage conveyer has an independently operable escapement mechanism, it is the usual practice to provide an individual power source on each storage conveyer for operating the escapement mechanism.

It is an object of the invention to provide article handling apparatus in which a single power source may be employed to control discharge of independently selected numbers of articles from a plurality of storage conveyers.

It is another object of the invention to provide an escapement mechanism for a storage conveyer having a positive action to eliminate the possibility of a carton driving through the escapement mechanism.

Still another object of the invention is to provide an escapement mechanism for a storage conveyer which may be readily and easily adjusted to condition the escapement mechanism to handle articles of different size.

The foregoing and other objects are achieved in article handling apparatus which includes a plurality of gravity conveyers located in aligned side-by-side relationship. Each conveyer is constructed with a longitudinally extending pusher plate normally maintained in a retracted position in which the plate extends along one side of the conveyer. Articles are guided along the aforementioned side of the conveyer and a stationary stop projects transversely partially across the conveyer above the pusher into the path of articles to locate the foremost article on the conveyer in front of the pusher. The stop may be adjusted longitudinally of the conveyer so that the trailing end of the first article in line lies slightly upstream of the conveyer from the upstream end of the pusher. Movement of the pusher from its retracted position transversely of the conveyer to an extended position drives the foremost article in line transversely across the conveyer beyond the stop.

Structure for guiding articles on the conveyer includes a stripper guard mounted upon the conveyer opposite the pusher plate. A first section of the guard is located directly opposite the pusher plate and is spaced from the pusher plate a sufficient distance so that an article may be shifted transversely of the conveyer to be located just short of engagement of the stripper guard when the pusher plate is in its fully extended position. At its upstream end the stripper guard is transversely offset toward the pusher plate side of the conveyer so that upstream from the pusher plate the stripper guard provides a passage having a width just sufficient to permit a single article to pass along the pusher side of the conveyer into alignment with the pusher plate. The stripper guard is mounted for adjustment transversely of the conveyer so that, by adjusting both the stop and the stripper guard, the escapement mechanism is adapted to handle articles of any given size or length.

A common actuating rod extends transversely beneath all conveyers and passes through openings formed in each pusher plate assembly and is supported for reciprocation transversely of the conveyers. Each pusher plate is provided with a normally released latch which may be actuated to couple the pusher plate to the actuating rod to be driven in article discharging movement by reciprocation of the rod.

A remote control system is provided to permit an operator to pre-select a given number of articles, and to assign the selected number to a selected one of the conveyers. The control system is such that the operator may select a number of articles to be discharged from each conveyer and subsequently actuate the control system to operate the drive means to repeatedly actuate the actuating rod while sequentially engaging the latch means of the respective selected conveyers with the rod for independently selected numbers of actuations of the rod.

Other objects and features of the invention will become apparent by reference to the following specification and to the drawings.

In the drawings:

FIG. 1 is a top plan view of an article handling apparatus embodying the present invention;

FIG. 2 is a side elevational view, partially in section, of the apparatus of FIG. 1;

FIG. 3 is an enlarged detail plan view of one of the storage conveyers of the apparatus of FIG. 1;

FIG. 4 is a detail side elevational view of the structure shown in FIG. 3;

FIG. 5 is a cross-sectional view taken on the line 5—5 of FIG. 3;

FIG. 6 is a cross-sectional view taken on the line 6—6 of FIG. 3;

FIG. 7 is a cross-sectional view taken on line 7—7 of FIG. 3;

FIG. 8 is a cross-sectional view taken on line 8—8 of FIG. 6;

FIG. 9 is a front elevational view of the control box for the apparatus of FIGS. 1 through 8;

FIG. 10 is a schematic diagram of the electrical control circuit for the apparatus of FIGS. 1 through 8; and, FIG. 11 is a schematic diagram of the pneumatic motor control system.

Referring first to FIG. 1, one exemplary form of the invention includes a pair of like storage conveyers 20A and 20B located in side-by-side relationship to feed articles such as cartons C to a main conveyer designated generally 22 in the form of a conventional belt conveyer.

In the usual case, a relatively large number of storage conveyers will be used in a warehouse, depending upon the number of different articles stocked. As will be seen from the following description only one type of article will be handled on a given conveyer at any given time. Conventionally the conveyers are arranged in banks of lines side-by-side and further in vertical tiers of banks. The invention permits each tier to be actuated from a single actuating member. The principle involved may be shown by only two conveyers, hence only two conveyers are shown in the drawings although it should be borne in mind that usually more than two conveyers will be used.

Conveyers 20A and 20B are gravity conveyers of similar construction and each includes an infeed section 24, an escapement section 26 and a curved transition section 28 to conduct articles from the discharge end of escapement section 26 onto the moving belt of main conveyer 22. As best seen in FIG. 2, the sections 24, 26 and 28 are all inclined downwardly toward main conveyer 22 so that articles supported upon the storage conveyer are urged, by gravity, toward main conveyer 22.

Infeed section 24 is constructed of a plurality of transverse frame members as 30 (FIG. 7) which support two longitudinally extending frame members 32 and 34, each of which supports a series of conveying wheels such as 36 for free rotation about parallel axes extending transversely of the longitudinal frame members. As best seen in FIG. 7, the conveying wheels supported by longitudinal frame member 32 is elevated above the wheels supported by longitudinal frame member 34 as by shims 32a so that the conveying surface defined by the wheels is inclined transversely of infeed section 24 toward frame member 34 at an angle of approximately 3°. Preferably, each transverse frame member is provided a series of bolt holes as 30a so that the transverse spacing between members 32 and 34 may be set according to the transverse dimension of the articles to be handled. A series of horizontal guide wheels 38 are mounted along the upper edge of frame member 34 to guide the lower sides of cartons C supported upon the infeed section.

Escapement section 26 includes a pair of spaced parallel side rails 40 and 42 which rotatably support a series of conveying rollers 44 for free rotation about horizontal axes. Side rail 40 of escapement section 26 also supports a series of horizontal guide wheels 46 which are aligned with guide wheels 38 on the infeed section and define a continuation of the guiding surface presented by guide wheels 38. Because of the transverse incline of infeed section 24, cartons passing from infeed section 24 onto escapement section 26 will normally ride along the guide surface defined by wheels 46 and will continue to advance along infeed section 26 until the leading carton engages a fixed side stop 48 mounted upon side rail 40 and projecting a short distance transversely from the side rail over the conveying surface defined by rollers 44. As best seen in FIGS. 4 and 6, stop 48 is rigidly secured, as by bolts 50 to an elongate bracket 52 rigidly bolted to the upper channel of side rail 40 as at 54 and 56. Stop 48 is located in a fixed position during operation of the apparatus; however in order to adjustably locate stop 48 in accordance with the size of articles being handled, bracket 52 is provided with a series of supplemental bores such as 58 so that stop 48 may be located at any of a plurality of selected positions longitudinally along bracket 52 as indicated by the phantom line showing of stop 48 in FIG. 4.

A limit switch LS–1 is mounted upon the outer side of stop 48 as by a fixed lug 60 with the striker 62 of the limit switch normally biased by spring 63 to a location in front of the article engaging surface of stop 48 as best shown in FIG. 8. A slot 64 is cut through stop 48 to permit striker 62 to swing behind the article engaging surface of stop 48 when a carton engages the stop. To distinguish between the limit switches LS–1 mounted on the respective conveyers, the limit switch LS–1 associated with the storage conveyer 20A has been identified in the drawings as limit switch LS–1A while the corresponding limit switch associated with storage conveyer 20B is identified as LS–1B.

Each of storage conveyers 20A and 20B is constructed with a pair of rod guiding tubes 66 which extend transversely across the conveyer beneath rollers 44 and through the respective side rails 40 and 42. Tubes 66 are rigidly secured in position to the respective side rails and slideably receive guide rods 68 of a pusher plate assembly. The pusher plate assembly includes a main plate 70 which is fixed to the outer ends of rods 68 as by nuts 72. A pusher member 74 is formed on each plate 70 to extend longitudinally along the storage conveyer at a location slightly above the conveying surface defined by rollers 44. Compression springs 75 acting between side rail 40 and plate 70 normally bias pusher plate to the full line position shown in FIG. 6 in which plate 74 defines an extension of the side guiding surface defined by guide wheels 46. Guide rods 68 support the pusher plate for the movement between the full line position of FIG. 6 and the phantom line position.

To drive the pusher plate through the range of movement indicated in FIG. 6, an actuating rod 76 is supported from both of conveyers 20A and 20B for movement transversely of the conveyers as by guides 78. At a location beneath conveyer 20A, actuating rod 76 is coupled to the piston rod 80 of a pneumatic motor 82 by a suitable coupling indicated at 84 in FIG. 6. Motor 82 is supported as by brackets 86 from cross frame members 88 mounted on extensions of rod guiding tubes 66 beyond the outer side of side rail 42.

Motor 82 is a double acting pneumatic motor connected through a control valve 90 to a source of air under pressure schematically illustrated at 92 in FIG. 11. A suitable valve 90 includes a movable valve member such as 96 having a pin 98 projecting into the head end of motor 82 and connected at its other end to armature 99 of solenoid SO–1. When the valve controlling solenoid SO–1 is energized, the valve is shifted to the right from its FIG. 11 position, thus projecting pin 98 to its minimum extent into motor 82 and positioning valve member 96 to connect the rod end of motor 82 to the source of air under pressure 92, thus driving piston rod 80 toward its retracted position. The head end of motor 82 is simultaneously vented through vent 100a. Solenoid SO–1 is only momentarily energized, as will be described below. When the piston of motor 82 reaches its fully retracted position, the motor piston engages pin 98 to shift valve member 96 back to the FIG. 11 position, thus connecting the head end of motor 82 to source 92 and venting the rod end of the motor through vent 100b. The speed of movement of piston rod 80 in either direction may be regulated by suitable control of the orifice of vents 100a or 100b in a conventional manner. To detect the position of piston rod 80 in its fully extended position, a limit switch LS–2 is mounted on rail 42 of conveyer 20B to engage structure on rod 76 when piston rod 80 is fully extended.

Both pusher plates 70 are normally disengaged from actuating rod 76, but may be coupled to the rod by a solenoid controlled latch assembly mounted upon each of the pusher plates. Each latch assembly is identical and includes a latch plate 102 slideably received within a guide bracket 104 mounted upon plate 70. A keyhole shaped slot or opening 106 is formed in the lower portion of latch plate 102 and actuating rod 76 normally passes freely through openings 106 in the latch plates of both conveyers 20A and 20B. A collar 108 is fixedly mounted on actuating rod 76 adjacent each pusher plate 70 at respective locations where the collar will be located just beyond the associated pusher plate 70 from the conveyer when piston rod is in its fully extended position. The diameter of collar 108 is smaller than the larger portion of the keyhole opening 106 so that when the latch plate is located in the position shown in FIG. 4, collar 108 passes freely, without interference, through the keyhole opening upon reciprocation of rod 76. The diameter of collar 108 is larger, however, then the lower portion 110 of the keyhole opening.

A latch operating solenoid SOA (conveyer 20A) or SOB (conveyer 20B) is mounted upon the pusher plate and its armature SOA' is coupled to latch plate 102 as at 111. When the solenoid is energized, the armature is lifited to lift latch plate 102 in a position where actuating rod 76 passes through the lower portion 110 of opening 106. Thus, when latch plate 102 is in its upper position, movement of actuating rods 76 to the right as viewed in FIG. 6 will result in collar 108 engaging latch plate 102 and since collar 108 cannot pass through the lower portion 110 of the keyhole shaped opening pusher plate 70 must move to the right with actuating rod 76 and pusher member 74 is moved from the full line position of FIG. 6 to the phantom position. Pusher plate 70 is resiliently biased by compression spring 75 to follow the return or leftward movement of rod 76 as viewed in FIG. 6. It will be noted in FIG. 6 that the stroke of pusher plate 74 is such as to move an article engaged by the pusher plate transversely across a conveyer to a location clear of the side of stop 48 as indicated in phantom line in FIG. 6.

As might be implied from the foregoing description, cartons are normally stored on the respective conveyers in rows with the foremost carton being gravitationally maintained against the stop 48 on the conveyer. This normal situation is shown on conveyer 20A of FIG. 1. To discharge a carton from the conveyer, actuating rod 76 is reciprocated to drive the pusher plate to the position shown on conveyer 20B of FIG. 1, thus moving the endmost carton out of alignment with the stop and permitting it to roll freely under gravity from the escapement section onto the main conveyer. To eliminate the possibility that the carton immediately behind the carton being discharged might be pulled transversely of the conveyer, as by friction between the cartons or by interlocking between flaps on the respective cartons, a stripper guard assembly designated generally 112 is mounted upon each storage conveyer opposite the pusher plate assembly.

Each guard 112 includes a longitudinal frame member 114 which is supported from cross frame members 116 of the storage conveyor frame by legs 118. Lugs 120 welded to the lower ends of legs 118 are bolted as at 122 to the cross frame members 116. Supplementary bores such as 124 (FIG. 6) in the cross frame members permit the stripper guard to be located at selected positions transversely of the conveyor to accommodate for different sizes of articles. Guide wheels 126 are mounted upon frame member 114 for free rotation about vertical axes.

At the upstream end of frame member 114 a frame plate 128 is rigidly secured to frame member 114 and projects transversely from frame member 114 to support a second series of guide wheels 130 for free rotation about vertical axes. Guide wheels 130 define a guide surface which is parallel to the guide surface defined by wheels 126 but which is offset toward side rail 40 from the guide surface defined by rollers 126. The direct distance from side rail 40 to wheels 130 is less than the distance from side rail 40 to rollers 126 by an amount substantially equal to the length of stroke of pusher plate 70. The spacing between guide wheels 130 and guide wheels 46 defines an inlet to the escapement section slightly greater than the width of a carton and thus cartons entering the escapement section are guided along one side of the conveyer.

The location of stop 48 is adjusted in accordance with the length of articles being handled by the conveyer so that the trailing edge of a carton or article whose leading edge is engaged with stop 48 will be located upstream of the conveyor from the upstream edge of the pusher plate and downstream of the conveyor from the righthand of downstream roller 130 on the stripper guard. Stripper guard 112 is adjusted transversely of the conveyer in accordance with the width of articles being handled so that a carton being transferred will almost but not quite engage rollers 126 when the pusher plate is at its forward limit of stroke, this relationship being illustrated by the right-hand carton on conveyer 20B in FIG. 1. It will be appreciated that once this adjustment is made the size of cartons handled by a given conveyer cannot vary substantially without requiring re-adjustment of the associated stop 48 and/or stripper guard 112. However, in normal warehouse operations, such adjustments are required on an infrequent or seasonal basis.

The electrical control circuit for operating the apparatus is schematically illustrated in FIG. 10. It is believed that a description of the electrical circuit will be most clearly understood by combining the description of the circuit with a description of the operation of the apparatus.

The electrical control circuit includes three stepping switches of a commercially available type: an individual stepping switch for each storage conveyor 20A and 20B and a master stepping switch. Each stepping switch includes a uni-directional rotary wiper having eleven rotary rest positions and a solenoid controlled ratchet for advancing the wiper from one rest position to the next rest position each time the solenoid is energized. In FIG. 10, the respective ratchet solenoids are designated at SSA, SSB and SSM. One of the eleven positions of each of the switches represents a normal or home position. The remaining ten positions respectively represent a number of articles to be discharged between one and ten articles. Each stepping switch is so connected as to include a normally closed and a normally open "off normal" contact, the normally closed "off normal contact" being opened only when the stepping switch is in its normal or home position and the normally open "off normal contact" being closed only when the stepping switch is in its normal or home position. These contacts appear in the circuit of FIG. 10 near the upper portion of the diagram.

In addition to the "off normal" contacts, the master stepping switch includes a bank of eleven non-bridging contacts designated generally at 200 in FIG. 10. In order to avoid undue complications in the diagram of FIG. 10, the eleven non-bridging contacts have not been shown as being equally spaced about the axis of their contacting wiper W. In the actual switch, assuming wiper W to be rotated in step to step movement in the clockwise direction indicated by the arrow in FIG. 10, the angular displacement between the non-bridging contact connected to contact 10b and the normal contact N would be equal to the angular displacement between any other two adjacent contacts.

Each of the ten non-bridging contacts is connected in parallel with normal contact N, each contact in turn being connected in series with a set of push button controlled contacts 1b—10b respectively. For the sake of clarity, push button contacts 1b—10b have been located on the diagram physically somewhat remote from respective push button contacts 1a—10a which are respectively mechanically coupled to the corresponding contact 1b—10b. The respective push buttons are such that the "a" contacts are normally open while the "b"

contacts are normally closed. Thus when the button controlling contacts 4a and 4b is depressed, contacts 4a are closed while contacts 4b are simultaneously opened.

Master stepping switch SSM also controls a set of normally closed contacts SSMa.

The circuit of FIG. 10 is operated from the control box shown in FIG. 9. The control box includes a first series of ten "Count Select" push buttons numbered 1–10 which respectively control contacts 1a, b through 10a, b of FIG. 10. In the apparatus described above, these push buttons are employed to select the number of cartons or articles to be discharged from a storage conveyer. A series of two "Line Select" push buttons designated A and B on the control box of FIG. 9 are employed to select the particular storage conveyer from which the articles are to be dispensed. A three position rotary switch 202 on the control box is employed to condition the circuit of FIG. 10 to receive an order for cartons to be dispensed from particular conveyers, to condition the control circuit to perform the dispensing operation or to render the circuit inoperative. Indicator lights 204 and 206 on the control box respectively indicate to the operator when an order has been set up by the control circuit and when the order has been completely discharged from the various conveyers.

As a normal condition just prior to the start of a discharge operation, both conveyors 20A and 20B will support an adequate supply of articles in the fashion shown on conveyer 20A of FIG. 1. Both pusher plate assemblies will be in their retracted position, the leading carton on both conveyors will be in engagement with the respective stops 48, actuating rod 76 will be in its fully extended position and both latch assemblies will be in their normal unlatched position. Thus, all limit switch strikers will be engaged and all limit switch contacts prefixed LS in FIG. 10 will be oppositely disposed from the condition shown in FIG. 10. The three stepping switches will all be located in their normal position. It will be assumed that the operator desires to discharge four cartons from storage conveyor 20A and to discharge eight cartons from storage conveyor 20B.

To commence the operation, the operator shifts switch 202 of FIG. 9 to the "Order Set Up" position and then depresses push button number 4 in the "Count Select" series of FIG. 9. This action closes contacts 4a of FIG. 10 and simultaneously opens contacts 4b. A circuit is completed from supply line L–1 through closed contacts 4a, wiper W, normal contact MN of the master stepping switch, normally closed contacts SSMa and the master stepping switch solenoid SSM to supply line L–2. This action moves stepping switch SSM one step away from its normal position to shift wiper W into contact with non-bridging contact 1. Since contacts SSMa are normally closed, the circuit through the master stepping switch solenoid is immediately opened, however the momentary energization is sufficient to step the switch ahead one step. As soon as SSM is de-energized, contacts SSMa shift back to their closed position and upon this shifting, coil SSM is again energized through wiper W and normally closed contacts 1b to again step the master stepping switch ahead one step. This action is repeated until the master stepping arrives at position 4 in which the opened contacts 4b hold the SSM energizing circuit open and the stepping switch comes to rest.

The operator then depresses and holds depressed "Line Select" button A (FIG. 9) which closes contacts PBA–1 and PBA–2 of FIG. 10. Since switch 202 is in the "Order Set Up" position, and the master stepping switch is in an "off normal" position, depression of "Line Select" button A completes a circuit from line L–1 through switch 202 and its "Set Up" contact, contacts SSM "Off N," contacts PBA–1, normally closed contacts TDa and a pulse relay coil PR to line L–2. When pulse relay PR is energized, it closes contacts PRa, b and c of FIG. 10. Contacts PRa energize a time delay relay TD which, after a short time delay, opens contacts TDa to de-energize the relay PR. However, relay PR remains energized and its contacts PRb and PRc remain closed long enough to transmit a pulse through master stepping switch solenoid SSM and stepping switch coil SSA, associated with conveyer A. This moves both of the stepping switches ahead one step, the master stepping switch moving from position 4 to position 5 while stepping switch SSA moves from its normal position to its position 1, the circuit coil SSA being completed through contacts PBA2 held closed by the manual depression of "Line Select" button A.

When pulse relay PR is de-energized by the operation of time delay relay TD, contacts PRa are opened to de-energize relay TD, thereby again closing contacts TDa to again energize the pulse relay. The foregoing action is repeated, master stepping switch coil SSM and stepping switch coil SSA being moved ahead one step upon each energization of the pulsing relay. When the master stepping switch SSM reaches its normal position, contacts SSM "Off N" are opened and contacts SSM "N" are closed, thus permanently opening the circuit to pulse relay PR and completing a circuit through indicator light 204 which lights upon the control box (FIG. 9) to indicate that the count has been set upon on the control circuit. "Line Select" button A may then be released.

It will be noted that in moving from position 4, the master stepping switch must move seven steps before it reaches its normal position, and thus stepping switch SSA rests upon its seventh position. However, since all stepping switches have eleven positions, stepping switch SSA is thus four steps away from its normal position, the four steps corresponding to the four articles to be discharged from conveyor 20A.

To enter the order of eight articles from conveyor 20B the foregoing procedure is repeated, however this time the operator depresses "Count Select" button 8 to drive the master stepping switch eight steps from its normal position. The operator then depresses "Line Select" button B and the foregoing action takes place in the control circuit with stepping switch SSB being operated upon instead of stepping switch SSA. When the order has been completely entered, master stepping switch SSM has returned to its normal position, stepping switch SSA is in its number 7 position, four steps away from normal, and stepping switch SSB is in its number 3 position, eight steps away from normal.

To commence the discharge operation, the operator shifts switch 202 from the "Order Set Up" to the "Order Release" position.

This action completes a circuit from supply line L–1 (FIG. 10) through the "Release" contact of switch 202. Both stepping switches SSA and SSB are in an "off normal" position, thus contacts SSA "Off N" and SSB "Off N" are closed. Since piston rod 80 is in its fully extended position, limit switch LS–2 is engaged and contacts LS–2a are closed, thus energizing control relay RX to close its contacts RXa, to complete a circuit through relay RA. When relay RA is energized, it closes lock-in contacts RAa to maintain relay RA energized until stepping switch SSA returns to its normal position. Relay RA thus maintains contacts RAb closed to energize latch solenoid SOA, lifting latch plate 102 of conveyer 20A into position to couple the pusher assembly of conveyer 20A to actuating rod 76. Contacts RAc are likewise closed by the energization of relay RA and since a carton is engaged with stop 48 of conveyer 20A contacts LS–1A are closed to energize solenoid SO1 to shift the piston control valve to the FIG. 11 position, thereby connecting pressure source 92 to motor 82 to drive the piston in a retracting stroke.

This action drives the pusher plate of conveyer 20A outwardly across the surface of the conveyer to shift the endmost carton out of alignment with stop 48, thereby permitting the carton to be discharged by gravity, onto main conveyer 22. As the piston rod moves from its fully extended position toward its retracted position, contacts LS–2a are opened and contacts LS–2b are closed, thereby completing a circuit through a fourth set of contacts RAd controlled by relay RA, to energize the stepping switch SSA coil, thereby moving the stepping switch ahead one step toward its normal position. Opening of contacts LS–2a, and also contacts LS–1a by disengagement of an article from stop 48 of conveyor 20A, de-energize solenoid SO–1, thereby permitting valve 90 to be reversed by the engagement of the motor piston with pin 98, thereby connecting motor 82 to drive piston rod 80 back to its fully extended position by the action of spring 90.

When piston rod 80 returns to its fully extended position, contacts LS–2a are again closed and contacts LS–2b are again opened. When the next carton on conveyor A arrives at stop 48, limit switch LS–1A is actuated to close its contacts LS–1A to again energize solenoid SO–1 to cause the piston to stroke again in the foregoing manner. This action is repeated four times until stepping switch SSA arrives in its normal position.

Arrival of stepping switch SSA in its normal position shifts its "off normal" contacts to the position shown in FIG. 10, to open the circuit to relay RA. A circuit is simultaneously completed to relay RB from the "Release" contacts of switch 202 through contacts SSA "N," contacts SSB "Off N" (closed because stepping switch SSB is still in an "off normal" position) and contacts RXb which are closed by the energization of relay RX when the piston rod returns to its fully extended position after discharging the fourth carton from conveyor 20A. Relay RB corresponds to relay RA and likewise is provided with a set of lock-in contacts RBa which maintain relay RB energized until stepping switch SSB returns to its normal position. Since relay RA is de-energized by the return of stepping switch SSA to its normal position, contacts RAb open to de-energize latching solenoid SOA to uncouple the pusher plate assembly of conveyor 20A from actuating rod 76 and contacts RAb open to prevent further energization of stepping switch coil SSA. Energization of relay RB closes contacts RBb to energize the latching solenoid SOB to latch the pusher assembly associated with conveyor 20B to actuating rod 76 and to also close contacts RBd to couple stepping switch coil SSB to limit switch contacts LS–2b. Piston rod control solenoid SO1 is coupled to contacts LS–2a through contacts RBc and limit switch LS–1B associated with the stop 48 on conveyer 20B.

Motor 82 is thus operated in repeated cycles in exactly the same fashion as during the discharge operation with conveyor 20A however, the pusher plate associated with conveyor 20B is actuated and stepping switch SSB is stepped upon each cycle of operation. Since stepping switch SSB was initially set eight steps away from its normal position, eight cycles of actuation of motor 82 occur and eight articles are discharged from conveyor 20B before stepping SSB returns to its normal position to switch its "Off Normal" contacts to the position shown in FIG. 10, thus opening the circuit to relay RB. With both stepping switches SSA and SSB returned to their normal position, indicator light 206 is energized to indicate the completion of the discharge operation.

While one embodiment of the invention has been described above, it will be apparent to those skilled in the art that the disclosed embodiment may be modified. Therefore, the foregoing description is to be considered exemplary rather than limiting, and the true scope of the invention is that defined in the following claims.

We claim:

1. Article handling apparatus comprising a pair of gravity conveyors, means on each of said conveyors for guiding articles along one side of the conveyor, a stop on each conveyor for accumulating articles along said one side of said conveyor, pusher means on each conveyer operable to shift an article engaged with the stop on the conveyer transversely of the conveyor to a location clear of the stop to discharge the article from the conveyor, an actuating member mounted for movement adjacent both of said pusher means, drive means actuable to drive said actuating member in cycles of pusher means operating movement, normally disengaged coupling means on each of said pusher means independently actuable to couple the pusher means to said actuating member, and selective control means comprising count-select means operable to pre-select a number of articles to be discharged, conveyor-select means operable to assign a first number of articles selected by a first operation of said count-select means to one of said conveyors and operable to assign a second number of articles selected by a subsequent operation of said count-select means to the other of said conveyors, and means controlled by said count-select means and by said conveyor-select means for actuating said drive means and the coupling means of said one conveyor, for disengaging the coupling means of said one conveyor and for engaging the coupling means of said other conveyor after said first number of repeated cycles of said actuating member, and for releasing the last mentioned coupling means and stopping operation of said drive means after said actuating member has been driven said second number of repeated cycles of movement with said last mentioned coupling means engaged therewith.

2. Article handling apparatus comprising a pair of gravity conveyors located in aligned side by side relationship, a longitudinally extending pusher mounted on each of said conveyors for movement transversely of the conveyer between a retracted position at one side of the conveyer and an extended position overlying the conveyer, means normally maintaining each of said pushers in its retracted position, a stop on each conveyor projecting transversely of the conveyor from said one side of the conveyer to a location between the retracted and extended positions of the associated pusher, an actuating rod extending transversely beneath both conveyers below said pushers, means supporting said rod for movement transversely of said conveyors between a rest position and an actuated position, drive means actuable to drive said rod from said rest position to said actuated position and return said rod to said rest position, normally released latch means on each pusher actuable to couple the pusher to said rod to drive the pusher from said retracted position to said extended position upon movement of said rod from said rest position to said actuated position, means for sequentially actuating said latch means, means for repeatedly actuating said drive means when either of said latch means is actuated, and means coupled to each of said latch means for releasing the latch means upon the completion of a pre-selected number of actuations of said drive means with the latch means in its actuated condition.

3. Article handling apparatus as defined in claim 2 including article sensing means on each of said stops actuable by the engagement of an article with said stop, and means coupled to said article sensing means to prevent actuation of said drive means until both the latch means and article sensing means of one of said conveyors are actuated.

4. Article handling apparatus comprising a gravity conveyer, a longitudinally extending pusher supported for movement transversely of said conveyer between a retracted position at one side of said conveyer and an extended position overlying said conveyer, a guide member overlying said conveyer at a location longitudinally spaced upstream of said conveyer from the upstream end of said pusher and operable to guide articles on said conveyer into a single line extending along said one side of said conveyer, a stop on said one side of said conveyer projecting transversely of the conveyer to a location intermediate the retracted and extended position of said pusher and located longitudinally of said conveyer to locate the trailing end of an article engaged with said stop within the longitudinal spacing between said pusher and said guide member, an actuating rod mounted beneath said conveyer for reciprocating movement transversely of said conveyer, and latch means on said conveyer selectively operable to couple said pusher to said actuating rod for a pre-selected number of reciprocations thereof, said actuating rod being operable when coupled to said pusher to drive said pusher from said retracted position to said extended position to thereby shift an article engaged with said stop transversely of said conveyer to a location clear of said stop, and means on said stop for maintaining said pusher in said retracted position until an article is engaged with said stop.

References Cited in the file of this patent

UNITED STATES PATENTS

| | | |
|---|---|---|
| 1,903,473 | Olson | Apr. 11, 1933 |
| 2,374,537 | Goldsmith | Apr. 24, 1945 |
| 2,698,699 | Skillman | Jan. 4, 1955 |
| 2,733,833 | Skillman | Feb. 7, 1956 |
| 2,769,570 | Adams | Nov. 6, 1956 |